(12) United States Patent
Yu

(10) Patent No.: US 6,922,935 B2
(45) Date of Patent: Aug. 2, 2005

(54) LIGHT EMITTING FISHING LURE

(76) Inventor: Sun Yu, 2850 Coolidge Hwy., Berkley, MI (US) 48072

( * ) Notice: Subject to any disclaimer, the term of this patent is extended or adjusted under 35 U.S.C. 154(b) by 0 days.

(21) Appl. No.: 10/760,957

(22) Filed: Jan. 20, 2004

(65) Prior Publication Data

US 2004/0144015 A1 Jul. 29, 2004

Related U.S. Application Data

(63) Continuation-in-part of application No. 10/237,639, filed on Sep. 9, 2002, now Pat. No. 6,684,557.

(51) Int. Cl.$^7$ ............................................. A01K 85/01
(52) U.S. Cl. ......................................... 43/17.6; 43/4.5
(58) Field of Search ............................... 43/17.5, 17.6, 43/4.5

(56) References Cited

U.S. PATENT DOCUMENTS

| | | | |
|---|---|---|---|
| 564,839 A | 7/1896 | Pflueger .................... | 43/17.6 |
| 1,407,534 A | 2/1922 | Hering et al. ............... | 427/554 |
| 1,637,963 A | 8/1927 | Sauvge ...................... | 427/157 |
| 1,817,694 A | 8/1931 | Lafky ........................ | 43/17.6 |
| 1,900,339 A | 3/1933 | Harrell ...................... | 43/17.6 |
| 2,303,097 A | 11/1942 | Townsend et al. .......... | 43/17.6 |
| 2,372,071 A | 3/1945 | Fernberger ........... | 252/302.4 R |
| 2,485,087 A | * 10/1949 | Diamond .................... | 43/17.5 |
| 2,500,442 A | 3/1950 | Waite ........................ | 43/17.6 |
| 2,528,083 A | 10/1950 | Ruff .......................... | 43/17.6 |
| 2,550,988 A | 5/1951 | Flournoy .................... | 43/17.6 |
| 2,552,224 A | 5/1951 | Setterblade ................ | 43/17.6 |
| 2,558,870 A | 7/1951 | Michelman ................. | 362/158 |
| 2,563,522 A | 8/1951 | Fisher ........................ | 43/17.5 |
| 2,568,279 A | 9/1951 | Franz et al. ............. | 250/459.1 |
| 2,598,471 A | 5/1952 | Waite ........................ | 43/17.6 |
| 2,621,437 A | 12/1952 | Pedranti .................... | 43/17.6 |
| 2,638,697 A | 5/1953 | Schwartz ................... | 43/17.6 |
| 2,649,802 A | 8/1953 | Poston ....................... | 43/17.6 |
| 2,691,839 A | 10/1954 | Duerig ....................... | 43/17.6 |
| 2,709,868 A | 6/1955 | Simmons .................... | 43/17.6 |
| 2,711,044 A | 6/1955 | Woods ....................... | 43/17.6 |
| 2,740,220 A | 4/1956 | Caplan ...................... | 43/17.6 |
| 2,754,610 A | 7/1956 | Carlson ..................... | 43/17.6 |
| 2,765,570 A | 10/1956 | Sedivy ...................... | 43/17.6 |
| 2,817,920 A | 12/1957 | Mitchell et al. ............ | 43/17.6 |
| 2,897,623 A | 9/1959 | Flournoy .................... | 43/17.6 |
| 2,939,240 A | 6/1960 | Goodman ................... | 43/17.6 |
| 2,955,375 A | 10/1960 | Mitchell .................... | 43/17.6 |
| 2,976,639 A | 3/1961 | King .......................... | 43/17.6 |
| 2,979,467 A | 4/1961 | Keller ................... | 252/301.4 S |
| 3,001,315 A | 9/1961 | Zimmermann ............. | 43/17.6 |
| 3,040,462 A | 6/1962 | Guida ........................ | 43/17.6 |
| 3,045,381 A | 7/1962 | Martin ....................... | 43/17.6 |
| 3,077,046 A | 2/1963 | Murray ...................... | 43/17.6 |
| 3,213,562 A | 10/1965 | Salvin et al. ............... | 43/17.6 |
| 3,308,569 A | 3/1967 | Foellner et al. ............ | 43/17.6 |
| 3,310,902 A | 3/1967 | Godby ....................... | 43/17.6 |
| 3,390,478 A | 7/1968 | McKnight et al. .......... | 43/17.6 |
| 3,393,465 A | 7/1968 | Powell ....................... | 43/17.6 |
| 3,535,812 A | 10/1970 | Crecelius ................... | 43/17.5 |

(Continued)

FOREIGN PATENT DOCUMENTS

| | | |
|---|---|---|
| AU | 665687 | 11/1995 |
| CA | 2290903 B1 | 5/2001 |
| CH | 617831 A5 * | 6/1980 |

(Continued)

*Primary Examiner*—Darren W. Ark
(74) *Attorney, Agent, or Firm*—Gifford, Krass, Groh, Sprinkle, Anderson & Citkowski, P.C.

(57) ABSTRACT

A light emitting fishing lure has a hollow body encompassing a multiple emission color light source and/or an ultraviolet LED light source. A light pipe is provided to transmit emission from the internal light source to the exterior of the lure. A regularly changing color emission is found to be attractive to fish during at least part of the color change cycle. Ultraviolet light emission operates to charge a phosphor decorating the lure body after ultraviolet light emission has ceased.

37 Claims, 2 Drawing Sheets

U.S. PATENT DOCUMENTS

| | | | | |
|---|---|---|---|---|
| 3,568,354 A | | 3/1971 | Yacko | 43/17.6 |
| 3,576,987 A | | 5/1971 | Voight et al. | 43/17.6 |
| 3,579,895 A | | 5/1971 | Orn | 43/17.6 |
| 3,608,228 A | | 9/1971 | Borresen et al. | 43/17.6 |
| 3,621,600 A | | 11/1971 | Dworski | 43/17.6 |
| 3,680,250 A | | 8/1972 | Hetrick | 43/17.6 |
| 3,690,028 A | | 9/1972 | Walker, Jr. | 43/17.6 |
| 3,708,903 A | | 1/1973 | Bercz et al. | 43/17.6 |
| 3,708,906 A | | 1/1973 | Stein | 43/17.6 |
| 3,721,033 A | | 3/1973 | Haynes | 43/17.6 |
| 3,762,092 A | | 10/1973 | Bercz et al. | 43/17.6 |
| 3,828,177 A | * | 8/1974 | Day | 43/17.6 |
| 3,834,058 A | | 9/1974 | Gaunt | 43/42.32 |
| 3,861,072 A | | 1/1975 | Holcombe | 43/17.6 |
| 3,863,380 A | | 2/1975 | Purlia | 43/17.6 |
| 3,870,843 A | | 3/1975 | Witte | 362/189 |
| 3,895,455 A | | 7/1975 | Johnston | 43/17.6 |
| 3,918,190 A | | 11/1975 | Hornbeck | 43/17.6 |
| 3,921,328 A | | 11/1975 | Holcombe | 43/17.6 |
| 3,935,659 A | | 2/1976 | McCallum | 43/17.6 |
| 3,940,868 A | | 3/1976 | Northcutt | 43/17.6 |
| 3,969,839 A | | 7/1976 | Ziegler | 43/17.6 |
| 4,085,538 A | | 4/1978 | Jankowski | 43/17.6 |
| 4,114,305 A | | 9/1978 | Wohlert et al. | 43/17.6 |
| 4,175,348 A | | 11/1979 | Ray | 43/17.6 |
| 4,194,936 A | | 3/1980 | Martuch | 43/17.5 |
| 4,227,331 A | * | 10/1980 | Ursrey et al. | 43/17.6 |
| 4,250,650 A | * | 2/1981 | Fima | 43/17.6 |
| 4,250,651 A | | 2/1981 | Ramme | 43/17.6 |
| 4,347,681 A | | 9/1982 | Fima | 43/17.6 |
| 4,426,803 A | | 1/1984 | Helling | 43/17.6 |
| 4,581,839 A | | 4/1986 | Mattison | 43/17.6 |
| 4,617,751 A | * | 10/1986 | Johansson | 43/17.6 |
| 4,621,447 A | * | 11/1986 | Rhodes | 43/17.6 |
| 4,638,584 A | | 1/1987 | Lindsay | 43/17.6 |
| 4,649,660 A | | 3/1987 | Kurka et al. | 43/17.5 |
| 4,663,880 A | | 5/1987 | Grohl | 43/17.6 |
| 4,669,213 A | | 6/1987 | LeRoy | 43/17.6 |
| 4,672,766 A | | 6/1987 | Mattison | 43/17.6 |
| 4,693,032 A | | 9/1987 | Mattison | 43/17.6 |
| 4,697,374 A | * | 10/1987 | Simms | 43/17.5 |
| 4,700,504 A | | 10/1987 | Mattison | 43/17.6 |
| 4,709,499 A | | 12/1987 | Ottaviano | 43/17.6 |
| 4,727,674 A | * | 3/1988 | Garr | 43/17.6 |
| 4,741,120 A | * | 5/1988 | Cota et al. | 43/17.6 |
| 4,751,788 A | | 6/1988 | Mattison | 43/17.6 |
| 4,757,632 A | | 7/1988 | Grobl | 43/17.6 |
| 4,763,433 A | | 8/1988 | Kulak | 43/17.6 |
| 4,774,643 A | | 9/1988 | McGinnis et al. | 362/189 |
| 4,777,756 A | | 10/1988 | Mattison | 43/17.6 |
| 4,782,432 A | | 11/1988 | Coffman | 362/184 |
| 4,796,167 A | | 1/1989 | Brown et al. | 362/158 |
| 4,799,327 A | * | 1/1989 | Treon | 43/17.6 |
| 4,800,670 A | | 1/1989 | Mattison | 43/17.6 |
| 4,811,513 A | | 3/1989 | Grohl | 43/17.6 |
| 4,819,361 A | * | 4/1989 | Boharski | 43/17.6 |
| 4,823,497 A | | 4/1989 | Pierce | 43/17.6 |
| 4,839,983 A | | 6/1989 | Pippert | 43/17.6 |
| 4,857,228 A | | 8/1989 | Kabay et al. | 252/301.4 S |
| 4,879,831 A | | 11/1989 | Herrlich | 43/17.6 |
| 4,885,864 A | | 12/1989 | Carner | 43/17.6 |
| 4,888,904 A | | 12/1989 | Douglas, Jr. | 43/17.6 |
| 4,888,905 A | * | 12/1989 | Garr | 43/17.6 |
| 4,959,919 A | | 10/1990 | Rao et al. | 43/17.6 |
| 4,972,623 A | * | 11/1990 | Delricco | 43/17.6 |
| 5,043,096 A | | 8/1991 | Lendmayer | 252/301.4 S |
| 5,063,700 A | * | 11/1991 | Kiefer et al. | 43/17.6 |
| 5,063,703 A | | 11/1991 | Riley | 43/42.06 |
| 5,070,437 A | | 12/1991 | Roberts, Sr. | 362/158 |
| 5,077,930 A | | 1/1992 | Berry | 43/42.33 |
| 5,157,857 A | * | 10/1992 | Livingston | 43/17.6 |
| 5,159,773 A | | 11/1992 | Gentry et al. | 43/17.6 |
| 5,175,951 A | | 1/1993 | Fruchey | 43/17.6 |
| 5,190,366 A | | 3/1993 | World | 43/17.6 |
| 5,210,525 A | | 5/1993 | Lennon et al. | 362/116 |
| 5,222,320 A | | 6/1993 | Erickson | 43/42.32 |
| 5,299,107 A | | 3/1994 | Ratcliffe et al. | 43/17.6 |
| 5,311,413 A | | 5/1994 | Farmer et al. | 43/17.6 |
| 5,330,282 A | * | 7/1994 | Rodgers | 43/17.6 |
| 5,376,303 A | | 12/1994 | Royce et al. | 252/301 R |
| 5,388,039 A | | 2/1995 | Dolph | 43/17.6 |
| 5,392,555 A | * | 2/1995 | Tingey | 43/17.6 |
| 5,414,951 A | | 5/1995 | Martin | 43/17.5 |
| 5,424,006 A | | 6/1995 | Murayama et al. | 252/301.4 R |
| 5,461,815 A | * | 10/1995 | Rodgers | 43/17.6 |
| 5,465,524 A | | 11/1995 | Vallone et al. | 43/17.6 |
| 5,472,737 A | | 12/1995 | Anders | 427/137 |
| 5,490,344 A | | 2/1996 | Bussiere | 43/17.6 |
| 5,495,690 A | | 3/1996 | Hunt | 43/17.6 |
| 5,504,342 A | * | 4/1996 | Jaynes et al. | 43/17.5 |
| 5,566,494 A | | 10/1996 | Zimmer | 43/17.6 |
| 5,697,182 A | | 12/1997 | Rodgers | 43/17.6 |
| 5,730,079 A | * | 3/1998 | Totty et al. | 43/17.5 |
| 5,758,449 A | * | 6/1998 | Munsterman et al. | 43/17 |
| 5,758,450 A | * | 6/1998 | Young | 43/17.6 |
| 5,943,809 A | | 8/1999 | Ring | 43/17.5 |
| 5,974,721 A | * | 11/1999 | Johnson et al. | 43/17.6 |
| 5,983,553 A | * | 11/1999 | Gordon | 43/17.6 |
| 5,987,802 A | | 11/1999 | Caprio | 43/17.6 |
| 6,005,024 A | | 12/1999 | Anders et al. | 523/172 |
| 6,018,902 A | | 2/2000 | Gudermuth et al. | 43/42.32 |
| 6,029,388 A | * | 2/2000 | Yokogawa et al. | 43/17.6 |
| 6,048,280 A | | 4/2000 | Palmer et al. | 473/416 |
| 6,055,763 A | | 5/2000 | Trotter | 43/17.6 |
| 6,079,144 A | | 6/2000 | Morgan et al. | 43/17.6 |
| 6,095,661 A | | 8/2000 | Lebens et al. | 362/184 |
| 6,098,331 A | | 8/2000 | Kim et al. | 43/17.6 |
| 6,108,960 A | | 8/2000 | Sylla et al. | 43/17.6 |
| 6,108,962 A | | 8/2000 | Barron | 43/17.6 |
| 6,182,391 B1 | | 2/2001 | Hubbard | 43/42.33 |
| 6,190,018 B1 | | 2/2001 | Parsons et al. | 362/116 |
| 6,192,617 B1 | | 2/2001 | Lyles | 43/17.6 |
| 6,195,929 B1 | | 3/2001 | Sylla et al. | 43/17.6 |
| 6,209,254 B1 | | 4/2001 | Sylla et al. | 43/17.6 |
| 6,226,917 B1 | | 5/2001 | Sylla et al. | 43/17.6 |
| 6,299,323 B1 | | 10/2001 | Yu et al. | 362/116 |
| 6,318,016 B1 | * | 11/2001 | Ellig | 43/17.6 |
| 6,336,288 B1 | | 1/2002 | Foss | 43/17.6 |
| 6,546,666 B2 | * | 4/2003 | Schultz et al. | 43/17.6 |
| 6,647,659 B1 | | 11/2003 | King et al. | 43/17.6 |
| 6,671,995 B1 | * | 1/2004 | Harkin | 43/17.6 |
| 6,684,557 B1 | * | 2/2004 | Yu | 43/17.6 |
| 6,807,766 B1 | * | 10/2004 | Hughes et al. | 43/17.6 |
| 2001/0013193 A1 | | 8/2001 | Schultz et al. | 43/17.6 |
| 2002/0174590 A1 | | 11/2002 | Nix et al. | 43/17.6 |
| 2003/0115787 A1 | | 6/2003 | Lindgren | 43/17.6 |
| 2003/0182841 A1 | | 10/2003 | Calak, Jr. et al. | 43/17.6 |
| 2003/0221357 A1 | * | 12/2003 | Parsons | 43/4.5 |
| 2004/0134114 A1 | * | 7/2004 | Afshari | 43/4.5 |

FOREIGN PATENT DOCUMENTS

| | | | | |
|---|---|---|---|---|
| CH | 617831 A1 | | 6/1980 | 43/17.6 |
| DE | 2757998 A1 | * | 6/1979 | |
| DE | 2943285 A1 | * | 5/1981 | |
| DE | 3402443 A1 | | 7/1985 | 43/17.6 |
| EP | 0 331 518 A1 | | 9/1989 | |
| EP | 1413193 A1 | * | 4/2004 | |
| FR | 633050 B1 | | 10/1927 | 43/17.6 |
| FR | 2590115 A1 | * | 5/1987 | |
| GB | 1638 B1 | | 1/1885 | 43/17.5 |
| GB | 144124 B1 | | 6/1920 | 43/17.6 |

| | | | | | | | | |
|---|---|---|---|---|---|---|---|---|
| GB | 1200511 | B1 | 7/1970 | ................. 43/17.6 | JP | 2000-184840 B1 * | 7/2000 | |
| JP | 1-108931 | B1 * | 4/1989 | | JP | 2000-189004 B1 * | 7/2000 | |
| JP | 01108931 | A | 4/1989 | ................. 43/17.6 | JP | 2001-224281 B1 * | 8/2001 | |
| JP | 3-4726 | B1 | 1/1991 | | JP | 2002-199828 B1 * | 7/2002 | |
| JP | 5-284883 | B1 | 11/1993 | | JP | 2002-360126 B1 * | 12/2002 | |
| JP | 8-116845 | B1 | 5/1996 | | JP | 2003-47369 B1 * | 2/2003 | |
| JP | 8-126450 | B1 | 5/1996 | | RU | 759073 A1 * | 9/1980 | ................. 43/17.6 |
| JP | 9-238596 | B1 | 9/1997 | | WO | WO-84/02446 A1 * | 7/1984 | |
| JP | 10-113099 | B1 * | 5/1998 | | WO | WO-88/09120 A1 * | 12/1988 | |
| JP | 10-127210 | B1 * | 5/1998 | | WO | WO-99/33337 A1 * | 7/1999 | |
| JP | 10-24861 | B1 | 9/1998 | | WO | WO-02/089568 A1 * | 11/2002 | |
| JP | 10-276618 | B1 | 10/1998 | | | | | |
| JP | 11-220977 | B1 * | 8/1999 | | * cited by examiner | | | | though other polymers are also operative herein. Optionally, the base material includes a pigmentary material to enhance phosphorescence color and/or provide a preselected color in the absence of phosphor stimulation.

LIGHT EMITTING FISHING LURE

RELATED APPLICATION

This application is a continuation-in-part of U.S. application Ser. No. 10/237,639 filed Sep. 9, 2002, now U.S. Pat. No. 6,684,557.

FIELD OF THE INVENTION

The present invention relates generally to fishing tackle and, in particular, to phosphorescent lures charged with ultraviolet radiation.

BACKGROUND OF THE INVENTION

It is well known that many deep-sea fish use bioluminescence to attract prey. Human anglers have recognized that under low light or poor visibility conditions, fish and other aquatic life forms are attracted to phosphorescent lures. While scientific basis for the attraction is as yet not completely understood, the stimulation and continued emission from a phosphorescent lure are important concerns under certain fishing conditions. Phosphorescent lures are more effective than non-emissive lures under most, if not all, fishing conditions; yet, phosphorescent lures remain a small part of the total lure market. Phosphorescent lures manufactured to date have not necessarily been of the highest quality nor included desirable features such as reticulations or integral hooks.

While a phosphorescent lure is readily charged by ambient light at midday, fishing often occurs under low light conditions, under darkness, or under cloud cover. As a result, phosphorescent lures are charged by exposing the lure to visible light emissions from a flashlight or strobe light. While a flashlight is compact, it suffers from low intensity illumination leading to rapid dissipation of lure phosphorescence. Conversely, a strobe light affords high photon flux density yet is cumbersome to operate under fishing conditions.

For reasons that remain poorly understood, fish are not merely attracted by light emission, but instead are predisposed to strike a lure emitting a particular color. The color a fish finds attractive is not constant. As a result, fishermen regularly use lures of varying color until a color attractive to fish is identified, then lures of that color are used in predominance.

Prior art lighted lures have suffered from limited duration phosphorescence associated with the use of an external phosphor charging jig. Chemiluminescent prior art lures have also met with limited acceptance owing to the inability to recharge the lumiphor. Still another class of prior art lighted lures include those containing an electrically powered light source where the light source has included an incandescent bulb and more recently a light emitting diode. Owing to the emission wavelengths from internally lighted lures, the charging of a phosphor in or on the lure has been impractical. Other prior art devices have been developed where the emission wavelength changes between two colors in response to an action. U.S. Pat. No. 5,974,721 is representative thereof. Additionally, lures have been developed that include flashing emissions. U.S. Pat. Nos. 5,330,282 and 5,392,555 are representative thereof. In spite of the prior art efforts, the problem persists as to how to present an illuminated lure that is emitting a color attractive to a fish.

SUMMARY OF THE INVENTION

A light emitting fishing lure has a hollow body terminating in an eyelet. A fishing hook is attached to the body. A multiple emission color light source is located within the body and powered by a battery source. A printed circuit board controller serves to automatically vary the color emission from the light source. A light pipe communicates emissions from the light source to the exterior of the fishing lure body. The regular variation and lure color is believed to be attractive to a passing fish at least sometimes, thereby enhancing the probability of a bite.

In another embodiment, a light emitting fishing lure has a hollow body and an exterior decorated with phosphor. A hook is coupled to the body. An ultraviolet light emitting diode light source is located within the body and powered by a battery source. A printed circuit board controller selectively activates the light source in a time pulsed manner. A light pipe is provided as part of the lure to communicate emissions from the light source to the phosphor decorating the lure body so as to induce phosphorescence.

A method of charging a phosphorescent fishing lure includes sealing a battery powered ultraviolet light emitting diode within a fishing lure that has a phosphor on the lure surface. The provision of an optical path between the ultraviolet light emitting diode and the phosphor assures that upon activation of the light emitting diode, the phosphor is charged and continues to phosphoresce after the light emitting diode has been deactivated.

DETAILED DESCRIPTION OF THE PREFERRED EMBODIMENTS

The present invention has utility as an aquatic lure. A commercial package is provided that includes a phosphorescent paint and applicator therefor or pressure adhesive appliqué impregnated with a phosphor, as well as an ultraviolet light emitting diode (UV LED) for stimulating the phosphorescent paint or appliqué. An improved process for stimulating any phosphorescent lure to emit light involves the use of a UV LED.

Phosphorescent paints, enamels and colorants are well known to the art and include, for example, U.S. Pat. Nos. 1,407,534; 1,637,963; 2,463,182; and 5,472,737. The choice of phosphor being dictated by the desired color of phosphorescence. Exemplary phosphor materials known to the art illustratively include group II metal-calcogenides, rare earth oxides, sulfides, phosphates, and combinations thereof doped with lanthanide series ions, such as $CaSr_2S:Bi$, $CaAl_2O_4:Eu, Nd$; and $CaSrS:Eu, Dy$. Specific compositions and colors are well known to the art as detailed, for example, in U.S. Pat. Nos. 2,372,071; 2,979,467; 5,043,096; 4,857,228; 5,424,006; and 5,376,303. Typically, a phosphor is dispersed as a particulate at from 1 to 70 total weight percent in a film forming base or impregnated into a polymeric appliqué. Preferably, the phosphor is dispersed from 5 to 50 weight percent. It is appreciated that multiple color phosphors are readily applied to a lure surface to yield regions of differing color emission.

The base material includes any film forming material conventional to the art, such as polyurethane, latex, acrylic and curable compositions such as epoxy, polysulfides, polythioethers, polyethers and polyisocyanates. Preferably, where the base material is curable, the base is ultraviolet light curable. A preferred paint is an acrylic. A preferred curable base is a UV curable epoxy. An exemplary two-part phosphorescent epoxy is detailed in U.S. Pat. No. 6,005,024.

A phosphorescent paint of the present invention is bottled and applied as a thin coating onto the body and/or hooks of a lure. The paint is applied by brush, spray or dip coating. Preferably, inventive phosphorescent paint is packaged within a kit in a bottle having a brush immersed therein, the brush affixed to a threaded bottle cap. Upon application of phosphorescent paint to a lure, the paint is allowed to cure in a manner particular to the base material composition. Representative cure conditions include ambient moisture, air, heat, UV light and combinations thereof. In instances where the paint is UV curable, the lure is illuminated by an ultraviolet LED flashlight. The proximity illumination of the UV curable phosphorescent paint with a UV LED is sufficient to induce cure thereof within a matter of a few minutes.

Figure 1:
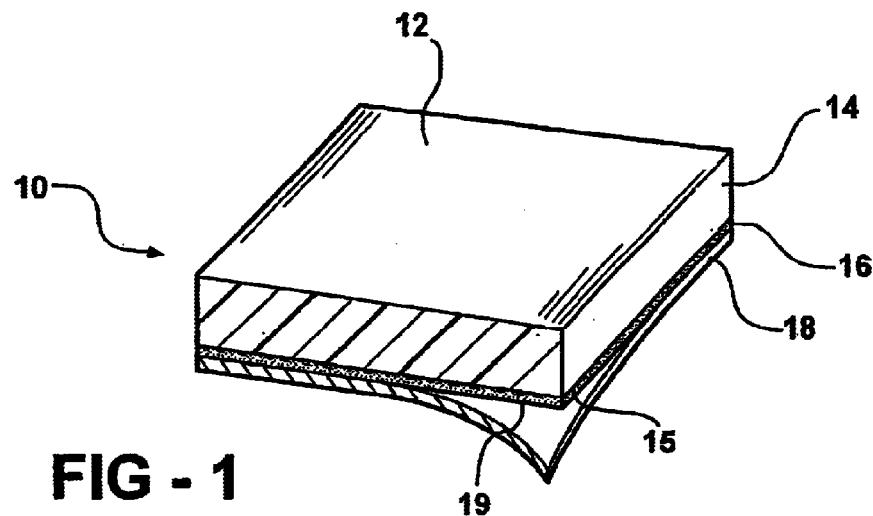
FIG. 1 is a perspective view of an adhesive appliqué containing phosphorescent particulate.

In an alternative embodiment shown in FIG. 1, an inventive appliqué is shown generally at 10, having phosphorescent material 12 embedded in or onto a polymeric sheet 14 amenable to adhesive securement to a surface of a lure. A phosphorescent polymeric sheet 14 typically contains one to twenty total weight percent of the polymeric sheet as phosphorescent particulate 12. The surface of the polymer sheet intended to contact a surface of the lure 15 is coated with a layer of conventional pressure sensitive adhesive 16. For storage purposes, the pressure sensitive adhesive is contacted with a removable backing layer 18. The backing layer 18 upon being peeled from the adhesive layer 16 exposes an active adhesive surface 19 for contact with a surface of a lure. The polymeric layer 14 is constructed of any material compatible with the phosphorescent particulate and the aqueous environment experienced by a lure in use. Materials from which polymeric layer 14 is constructed illustratively include polyethylene, polyvinyl chloride, and polyacrylate. While the thickness of an inventive polymeric layer is appreciated to vary with factors such as polymeric stiffness, phosphorescent particle loading and lure environment, the thickness is generally between 5 and 50 mils. It is appreciated that the appliqué 10 is readily cut into any number of shapes for application to a lure surface.

Regardless of the application method, once a phosphorescent material is attached to the surface of a lure, a UV LED flashlight affords a highly efficient charge of the phosphor resulting in efficient phosphorescent emission. A UV LED flashlight operative in the present invention emits either UV-A corresponding to between 315 nm and 405 nm or UV-B corresponding to between 280 nm and 320 nm. Operative UV LEDs herein include gallium indium nitride and gallium nitride. The UV LED flashlight preferably fits readily within the palm of one's hand. More preferably, the flashlight has a hook attachment such as that detailed in U.S. Pat. No. 6,299,323. Most preferably, a float is attached to the flashlight such that upon dropping the flashlight in the course of handling, the flashlight may be identified and retrieved by way of the attached float.

In an alternate embodiment, a battery powered mercury vapor arc or other ultraviolet light emitting gaseous tube is utilized to charge an inventive phosphor film or appliqué. These other gaseous tube UV emitters illustratively include metal halogens of iron-cobalt, gallium-indium and iron-gallium. It is appreciated that the size and efficiency of a UV LED relative to a tube ultraviolet emitter makes a UV LED a preferred phosphorescent charging source.

A commercial package according to the present invention includes a phosphorescent paint or appliqué amenable to application to a lure surface. The package also includes a UV LED flashlight and instructions for the use thereof to charge a lure having a phosphorescent film or appliqué thereon.

Figure 2:
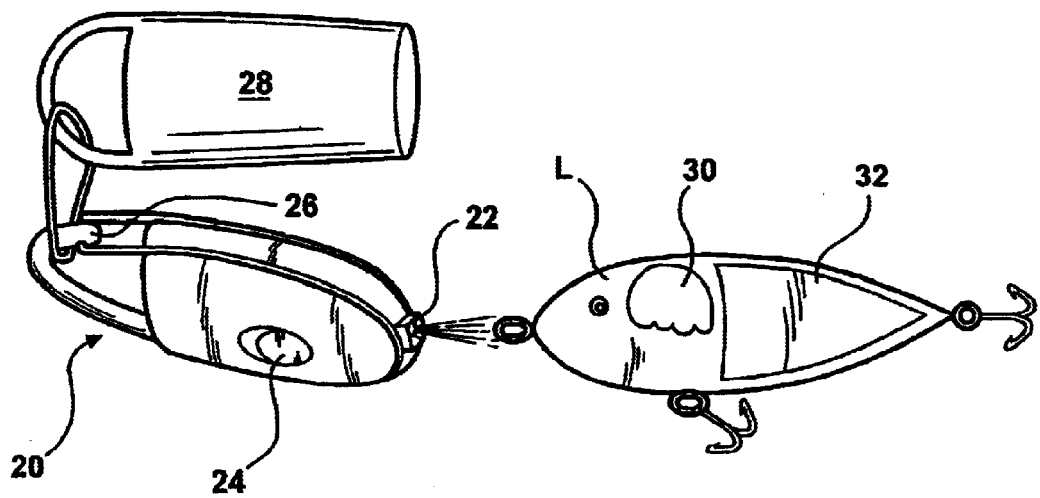
FIG. 2 is a schematic illustrating charging of a phosphorescent lure according to the present invention.

Referring now to FIG. 2, a UV LED flashlight is shown generally at 20. The flashlight 20 has an LED 22 that emits in either the UV-A or UV-B wavelength range. A switch 24 selectively illuminates the LED 22. A battery (not shown) within the flashlight 20 selectively forms a circuit with contacts of the switch 24 and leads of the LED 22 upon switch engagement. The flashlight 20 in a preferred embodiment has a hook 26 to which a float 28 is attached. The float 28 having sufficient buoyancy to retain the flashlight 20 proximate to the water surface in the event that the flashlight 20 falls into water. The emission from the LED 22 is directed onto a lure L having an inventive phosphorescent film 30 and/or a phosphorescent inventive appliqué 32 thereon. The now stimulated phosphorescent film 30 and/or phosphorescent appliqué 32 emits for a period of time consistent with the phosphorescent particulate decay time during which time the lure is presented to prey fish in an aquatic environment.

In an alternate embodiment, a lure having pre-applied regions of phosphorescent film or phosphorescent appliqué is packaged with a UV LED flashlight, battery powered mercury vapor arc lamp or other UV emitting gaseous tube light source.

Figure 3:
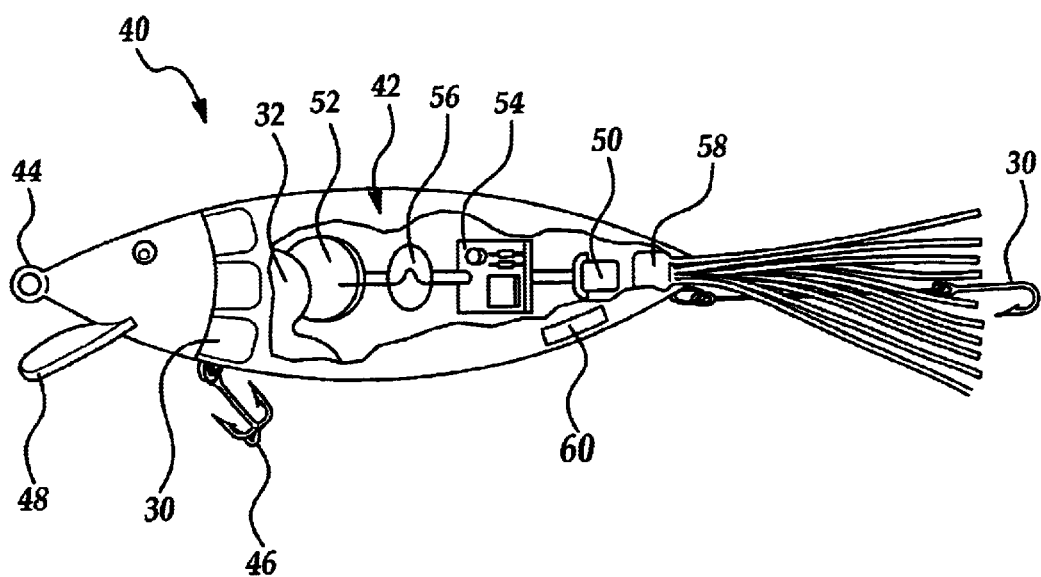
FIG. 3 is a partial cutaway view of an inventive lure containing a phosphor charging system therein.

Referring now to FIG. 3, an inventive fishing lure is depicted generally at 40. While the lure 40 depicted in FIG. 3 is a plug, it is appreciated that the present invention is operative in various other types of fishing lures formed to have a hollow cavity, these illustratively including jigs, flatfish, spinner baits, and buzz baits. The lure 40 has a hollow body 42 terminating at the proximal end in an eyelet 44 for securement to fishing line, and at least one hook 46. The body 42 is formed of a polymeric material. Preferably, the body 42 is an injection molded thermoplastic. The lure 40 optionally has a lip 48. Within the body 42 resides a light source 50, a battery source 52 therefor, a printed circuit board controller 54, and a switch 56. A trailing light pipe 58 serves to transmit emission from the light source 50 to the exterior of the lure body 42. The trailing light pipe 58 is in the form of an optic fiber. An embedded light pipe 60 within the body 42 transmits emission from the light source 42 through the body 42. It is appreciated that a transparent or translucent body 42 is operative as an embedded light pipe 60. An embedded light pipe 60 is well suited to illuminate the body 42 and give the impression of shiny scales or other reflective anatomical features of an actual live bait. The emission from the trailing light pipe 58 or embedded light pipe 60 also charges an optional phosphor particulate embedded in the body 42, an optional phosphorescent film 30 and or an optional phosphorescent appliqué 32 decorating the exterior of the body 42. With respect the phosphorescent film 30 and a phosphorescent appliqué 32, these terms and reference numerals are intended to denote the materials previously detailed with respect to FIGS. 1 and 2. It is appreciated that the trailing light pipe 58 and the embedded light pipe 60 are each operative independently in an inventive embodiment or incorporated into a single inventive lure 40. Preferably, the trailing light pipe 58 is a bundle of optical fibers shaped in the form of a lure skirt. By way of non-limiting theory it is believed that the skirt gives a fish the general impression of tail and/or a ripple in the water indicative of movement.

The light source 50 includes an incandescent bulb, a light emitting diode, and a phosphorescent emitter element. Preferably, the light source is a light emitting diode (LED). The light source 50 has a variable color output provided by a light emitting diode having a multiple color output or at least two light emitting diodes where the first light emitting diode has a first single color output and a second light emitting diode where the first color output differs from the second color output. Preferably, in either instance of a multiple color output LED or multiple LEDs, the light source 50 includes a UV output or UV LED. The variable color light source optionally includes a third light emitting diode having a third color output, where the third color output varies from the second color output. The variable color output of the light source is varied automatically through the printed circuit board controller 54, which automatically cycles the light source color upon initial switch activation and continues to cycle the colors until switch deactivation. Typical cycle times range from 5 to 300 seconds. Optionally, the cycle includes a period of no emission to allow for fluorescence emission. When multiple light sources are present, it is appreciated that two or more light sources having different emission characteristics can be controlled to afford different illumination levels and therefore a varying color emission. Preferably, the light source 50 is oriented to direct a majority of the emission therefrom into the trailing light pipe 58 or the embedded light pipe 60.

In an alternative embodiment, the light source 50 is a UV LED 22, as described with respect to FIGS. 1 and 2 and the lure exterior is decorated with a phosphorescent film 30 or appliqué 32 that is stimulated by the emission of UV LED 22. Preferably, when the light source 50 is UV LED 22, the UV LED 22 is activated in a time pulsed manner by the controller 54 consistent with the decay time of the phosphor film 30 or appliqué 32.

The battery source 52 is selected according to the present invention to have a voltage output to activate the light source 50. Battery types operative herein alone or in series to increase the output voltage include alkaline dry cells, metal hydride, and lithium batteries. Preferably, a button-type battery is provided to save space within the body 42. More preferably, the battery source 52 is a lithium battery stack of two or more cells. Upon battery discharge a new sealed optical emission module is inserted into the body 42 or the lure 40 discarded.

The switch 56 is provided for selectively forming an electrical engagement between the light source 50 and the battery source 52. The switch 56 is preferably sealed within the body 42. An inventive switch 56 illustratively includes a kinetic switch, a motion detector, and an electrical resistivity switch in which water contact serves as the circuit closing bridge. Preferably, the switch 56 is a kinetic switch activated by a sharp kinetic movement of the lure 40.

Optionally, the printed circuit board controller 54 modifies the battery source output voltage to either increase or decrease the battery output voltage to more closely correspond to the light source activation voltage. Preferably, the modified battery output voltage is within 20 excess percent of the light source activation voltage. More preferably, the modified output voltage is within 10 excess percent of the light source activation output voltage. In instances where a light emitting diode is the light source, it is often the case that the light emitting diode activation voltage is greater than that of a single dry cell or lithium battery output voltage and as such multiple batteries operating in series are required to drive the light emitting diode. Additional batteries increase both the cost and weight of an inventive liquid dispensing container. As such, the use of a conventional transformerless voltage step-up circuit is employed to increase the battery output voltage to at least that of the LED activation voltage. Typically, step-up circuitry increases the battery output voltage by a factor of between 1.6 and 3 in order to provide sufficient voltage to drive a light emitting diode at its activation voltage or above.

Patents and patent applications mentioned in the specification are indicative of the levels of those skilled in the art to which the invention pertains. These patents and applications are incorporated herein by reference to the same extent as if each individual patent or application was specifically and individually incorporated herein by reference.

The foregoing description is illustrative of particular embodiments of the invention, but is not meant to be a limitation upon the practice thereof. The following claims, including all equivalents thereof, are intended to define the scope of the invention.

What is claimed is:

1. A light emitting fishing lure comprising:
    a hollow body having an exterior with a phosphor on at least parts thereof, a distal end and a proximal end, the proximal end terminating in an eyelet;
    a hook coupled to said body;
    a battery source;
    a multiple emission color light source located within said body;
    a printed circuit board controller for said light source that automatically varies color emission from said light source; and
    a light pipe in optical communication between said light source and the exterior of said body.

2. The lure of claim 1 wherein the phosphor on the exterior of said body is selected from the group consisting of an embedded particulate, a film, and an appliqué.

3. The lure of claim 1 wherein said battery source is a button-type battery.

4. The lure of claim 1 wherein said light source is a multiple color single light emitting diode.

5. The lure of claim 4 wherein said multiple color single light emitting diode has an ultraviolet emission.

6. The lure of claim 1 wherein said light source is a plurality of light emitting diodes.

7. The lure of claim 6 wherein said plurality of light emitting diodes comprises an ultraviolet light emitting diode.

8. The lure of claim 1 wherein said light pipe is embedded in said body.

9. The lure of claim 8 wherein said body is transparent or translucent and functions as said light pipe.

10. The lure of claim 1 wherein said light pipe is a trailing fiber optic.

11. The lure of claim 10 wherein said light pipe is a plurality of fiber optics emanating from the distal end of said body.

12. The lure of claim 1 further comprising a switch for selectively forming an electrical circuit between said light source and said battery.

13. The lure of claim 12 wherein said switch is located within said body.

14. The lure of claim 12 wherein said switch is of a type selected from the group consisting of: kinetic, motion detection, and electrical resistivity.

15. The lure of claim 12 wherein said switch is a kinetic switch.

16. The lure of claim 1 further comprising a transformerless voltage step-up circuit intermediate between said battery and said light source.

17. The lure of claim 16 wherein said transformerless voltage step-up circuit increases output voltage from said battery source by a factor of between 1.6 and 3.

18. A light emitting fishing lure comprising:

a hollow body having an exterior decorated with a phosphor, a distal end and a proximal end, the proximal end terminating in an eyelet;

a hook coupled to said body;

a battery source;

an ultraviolet light emitting diode light source located within said body;

a printed circuit board controller for said ultraviolet light emitting diode light source to selectively activate said ultraviolet light emitting diode light source in a time pulsed manner; and a light pipe in optical communication between said light source and the exterior of said body.

19. The lure of claim 18 wherein the phosphor on the exterior of said body is selected from the group consisting of an embedded particulate, a film, and an appliqué.

20. The lure of claim 18 wherein said light pipe is embedded in said body.

21. The lure of claim 18 wherein said light pipe is a trailing fiber optic.

22. The lure of claim 21 wherein said light pipe is a plurality of fiber optics emanating from the distal end of said body.

23. The lure of claim 18 further comprising a switch for selectively forming an electrical circuit between said light source and said battery.

24. The lure of claim 23 wherein said switch is located within said body.

25. The lure of claim 23 wherein said switch is selected from the group consisting of: kinetic, motion detection, and electrical resistivity.

26. The lure of claim 23 wherein said switch is a kinetic switch.

27. The lure of claim 18 further comprising a transformerless voltage step-up circuit intermediate between said battery and said light source.

28. The lure of claim 27 wherein said transformerless voltage step-up circuit increases output voltage from said battery source by a factor of between 1.6 and 3.

29. The lure of claim 18 wherein said ultraviolet light emitting diode is gallium indium nitride.

30. The lure of claim 18 wherein said ultraviolet light emitting diode is gallium nitride.

31. A method of charging a phosphorescent fishing lure comprising the steps of:

sealing a battery powered ultraviolet light emitting diode within a fishing lure having a phosphor thereon;

providing an optical path between said ultraviolet light emitting diode and said phosphor; and activating said ultraviolet light emitting diode to charge said phosphor.

32. The method of claim 31 wherein activating said ultraviolet light emitting diode is in a time pulsed manner.

33. The method of claim 32 wherein the time pulsed manner is on a time scale comparable with a decay time of said phosphor.

34. The method of claim 31 wherein the optical path is via an optical fiber.

35. The method of claim 34 wherein said optical fiber is embedded in said fishing lure.

36. The method of claim 34 wherein said optical fiber is a wailing optical fiber.

37. The method of claim 36 wherein said trailing optical fiber is a plurality of fibers emanating from said fishing lure.

* * * * *

UNITED STATES PATENT AND TRADEMARK OFFICE
CERTIFICATE OF CORRECTION

PATENT NO. : 6,922,935 B2 Page 1 of 1
DATED : August 2, 2005
INVENTOR(S) : Sun Yu It is certified that error appears in the above-identified patent and that said Letters Patent is hereby corrected as shown below:

<u>Column 8,</u>
Line 31, replace "wailing" with -- trailing --.

Signed and Sealed this

Twenty-third Day of May, 2006

JON W. DUDAS
*Director of the United States Patent and Trademark Office*